United States Patent
Krebs et al.

(10) Patent No.: US 9,291,198 B2
(45) Date of Patent: Mar. 22, 2016

(54) LANDING BEARING AND MAGNETIC BEARING ASSEMBLY

(71) Applicant: Aktiebolaget SKF, Göteborg (SE)

(72) Inventors: Philipp Krebs, Nieuwegein (NL); Xiaobo Zhou, PV Houten (NL)

(73) Assignee: AKTIEBOLAGET SKF, Gothenburg (*) Notice: Subject to any disclaimer, the term of this patent is extended or adjusted under 35 U.S.C. 154(b) by 0 days.

(21) Appl. No.: 14/276,286

(22) Filed: May 13, 2014

(65) Prior Publication Data
US 2014/0334754 A1    Nov. 13, 2014

(30) Foreign Application Priority Data
May 13, 2013 (EP) .................................. 13167463

(51) Int. Cl.
F16C 33/10   (2006.01)
F16C 32/04   (2006.01)
F16C 39/02   (2006.01)

(52) U.S. Cl.
CPC ......... F16C 33/1065 (2013.01); F16C 32/0442 (2013.01); F16C 33/104 (2013.01); F16C 39/02 (2013.01); *F16C 2240/42* (2013.01)

(58) Field of Classification Search
CPC ............. F16C 32/0402; F16C 32/0406; F16C 32/0442; F16C 33/1065; F16C 33/104; F16C 39/02; F16C 2240/42
See application file for complete search history.

(56) References Cited

U.S. PATENT DOCUMENTS

| 379,531 | A | * | 3/1888 | Douglas, Jr. | 508/108 |
| 5,083,053 | A | * | 1/1992 | New | 310/90.5 |
| 5,094,548 | A | * | 3/1992 | Danly, Sr. | 384/30 |
| 5,272,403 | A | * | 12/1993 | New | 310/90.5 |
| 5,352,541 | A | * | 10/1994 | Tanaka et al. | 428/628 |
| 5,462,362 | A | * | 10/1995 | Yuhta et al. | 384/13 |
| 5,549,394 | A | * | 8/1996 | Nowak et al. | 384/282 |
| 5,693,994 | A | * | 12/1997 | New | 310/90.5 |
| 5,739,609 | A | * | 4/1998 | Ueyama et al. | 310/90.5 |
| 6,095,690 | A | * | 8/2000 | Niegel et al. | 384/293 |
| 6,513,238 | B1 | * | 2/2003 | Schlegel | 29/888.09 |
| 6,872,002 | B2 | * | 3/2005 | Tomita et al. | 384/12 |
| 7,387,442 | B2 | * | 6/2008 | Spikes | 384/276 |
| 7,547,466 | B2 | * | 6/2009 | Misu et al. | 427/350 |
| 2002/0157534 | A1 | * | 10/2002 | Schneider et al. | 92/187 |
| 2003/0161559 | A1 | * | 8/2003 | Kurobe et al. | 384/119 |
| 2004/0228554 | A1 | * | 11/2004 | Fujita et al. | 384/291 |
| 2005/0013041 | A1 | * | 1/2005 | MaCleod et al. | 360/99.08 |
| 2005/0105835 | A1 | | 5/2005 | Spikes | |
| 2005/0111769 | A1 | * | 5/2005 | Haga | 384/119 |

(Continued)

FOREIGN PATENT DOCUMENTS

| KR | 20110071928 A | 6/2011 |
| WO | 2012071639 A1 | 6/2012 |
| WO | 2012158266 A2 | 11/2012 |

*Primary Examiner* — Alan B Waits
(74) *Attorney, Agent, or Firm* — Bryan Peckjian; SKF USA Inc. Patent Dept.

(57) ABSTRACT

A landing bearing for use in a magnetic bearing assembly is provided. The landing bearing includes a first landing surface configured to be mounted on a shaft and a bushing having a second landing surface configured to be mounted in a housing or in a stator coaxially with the landing sleeve. The second landing surface is arranged so as to face the first landing surface. It is proposed that at least one of the first landing surface and the second landing surface is provided with at least one recess for receiving lubricant.

15 Claims, 5 Drawing Sheets

(56) References Cited

U.S. PATENT DOCUMENTS

| | | | |
|---|---|---|---|
| 2008/0218019 A1* | 9/2008 | Sumi | 310/90 |
| 2009/0092347 A1* | 4/2009 | Ito et al. | 384/119 |
| 2009/0302698 A1* | 12/2009 | Menz et al. | 310/90.5 |
| 2010/0034494 A1 | 2/2010 | Hori | |
| 2011/0206311 A1* | 8/2011 | Dittmer et al. | 384/607 |
| 2011/0235955 A1* | 9/2011 | Lee et al. | 384/397 |
| 2012/0315169 A1* | 12/2012 | Hori et al. | 417/423.12 |
| 2013/0315513 A1* | 11/2013 | Manke et al. | 384/13 |
| 2014/0169711 A1* | 6/2014 | Hanaka et al. | 384/284 |
| 2014/0270606 A1* | 9/2014 | Hori et al. | 384/112 |

* cited by examiner

LANDING BEARING AND MAGNETIC BEARING ASSEMBLY

CROSS-REFERENCE TO RELATED APPLICATIONS

This application claims priority to European Patent Application EP13167463.2 filed May 13, 2013, the contents of which is herein fully incorporated by reference.

TECHNICAL FIELD

The invention relates to a landing bearing for use in a magnetic bearing assembly and to a magnetic bearing assembly including the landing bearing according to the invention.

TECHNICAL BACKGROUND

It is known to use magnetic bearings which, in normal operation, maintain a rotor or a shaft in a centered radial position inside the stator without mechanical contact between the rotor and the stator by using magnetic levitation. Magnetic bearings comprise electromagnets powered electrically by appropriate circuits to servo-control the radial position of the rotor in the stator.

The effectiveness with which the rotor is held radially inside the stator is determined by the force delivered by the electromagnets, and this requires the electromagnets to be stably powered with sufficient electrical energy.

If there is an interruption in the supply of electricity to the electromagnets or if large radial or axial forces suddenly act on the shaft or the rotor supported by the magnetic bearing, the latter may no longer be able to center the rotor and a "landing" state occurs in which the rotor changes from being held in a state without mechanical contact to being held in a state with mechanical contact.

During such landing, the rotor tends to come into contact with the stator. Because the rotor or the shaft is spinning very fast in usual applications, e.g. at more than 30,000 revolutions per minute (rpm), such contact can lead to the device including the magnetic bearing being destroyed.

To solve this problem, magnetic bearing applications have already been fitted with secondary mechanical bearings for landing purposes, which are usually referred to as landing bearings.

Since magnetic bearings usually run at very high speed, the emergency stop (sliding) power is usually high. This high stop power requires high wear resistance and low friction on the landing bearing. Due to limitation of the space and for cost reasons, sliding plain bearings are preferred over rolling bearings, especially for small active magnetic bearing systems.

Oil lubrication to provide hydrodynamic lubrication for a sliding bearing requires a large space and an expensive sealing system. Grease lubrication is difficult to seal, since grease will be pushed-out due to the conforming contact of the sliding bearing. To overcome damage from high sliding power, advanced coatings, such as diamond-like-carbon (DLC) have been recommended to coat the inner ring or the sleeve for the plain bearing, which however significantly increases the cost of the landing bearing

SUMMARY OF THE INVENTION

The invention tries to solve the above problems by providing a landing bearing with high durability while avoiding leakage of lubricant.

The invention relates to a landing bearing for use in a magnetic bearing assembly, the landing bearing comprising a first landing surface preferably formed on a sleeve being configured to be mounted on a shaft and comprising a second landing surface preferably formed on a bushing being configured to be mounted in a housing or in a stator coaxially with the landing sleeve. The second landing surface is arranged so as to face the first landing surface.

As an alternative to the provision of the coated landing surface on a sleeve or a bushing, the coating may be applied directly on the rotor and/or housing.

It is proposed that at least one of the first landing surface and the second landing surface is provided with at least one recess filled with lubricant. The landing bearing may be a radial bearing or an axial bearing or a radial-axial bearing combining two or more landing surfaces standing at an angle to each other. The surfaces may be provided on one piece or on two pieces of the bearing ring. For the ease of manufacturing, the landing surface provided with the recess is preferably the first landing surface, i.e. one of the surfaces of the landing sleeve.

The recess on the landing surface retains the lubricant for long period of time while at the same time preventing leakage. As a result, a cost-saving landing bearing with excellent or at least satisfactory lifetime may be achieved.

Preferably, at least one of the first landing surface and the second landing surface is coated with a porous structure layer. The porous structure layer may absorb base oil of the lubricant avoid leakage. The absorption of the base oil is particularly effective if the porous structure layer is provided on the same landing surface as the recess.

Preferably, the bushing is made of hardened steel with minimum surface hardness of 40 HRC, preferably higher than 52 HRC. Further, it is proposed that the landing sleeve is made of hardened steel, (which may in particular be harder than the steel used for the bushing), with minimum surface hardness of 40 HRC, preferably higher than 52 HRC. Higher hardness of sleeve may reduce wear. However, for cost-saving reasons, it is advantageous to use the same steel for both the sleeve and the bushing.

A sufficient and reliable effect may be achieved when the porous structure layer has a pore size of 0.001 to 2 µm, porosity density 1 to 20% and/or layer thickness of 0.5 to 20 µm. The pore size in this range is easy to achieve in terms of manufacturing on the one hand, while larger pore sizes may also weaken the structure and load carrying capacity and smaller pore sizes cannot be filled with lubricant.

Preferably, the porous structure layer has a pore size 0.1 to 1 µm, a porosity density of 5 to 10% and/or a layer thickness of 3-7 µm. This layer thickness is chosen such that it is easy to achieve in terms of manufacturing on the one hand, while a larger layer thickness sizes may also weaken the structure and load carrying capacity.

It is further proposed that the porous structure layer comprises at least one of Mn-phosphate, Zn—Ca-phosphate and black oxide. Mn-phosphate has a higher pore density, higher layer thickness, but is relative softer than black oxide. Therefore, Mn-phosphate is the preferable choice for long duration but soft landing. Black oxide has a lower pore density, lower layer thickness, but higher hardness. Therefore, black oxide is the preferable choice for hard landing but short duration. Zn-phosphate is softer than the other two coatings, thinner than Mn-phosphate but thicker than black oxide. It may be used for moderate landing conditions.

In a preferred embodiment of the invention with a simple manufacturing process, the porous structure layer is applied using a chemical conversion processes, preferably at temperature from 80 to 140° C.

Other potential coatings might be applied using methods such as plasma deposition, PVD or CVD.

A sufficient and reliable effect may be achieved when the recess has a depth in a range of 0.1 to 5 mm. Preferably, the recess has a depth in a range of 0.25 to 1 mm, which creates a sufficient volume for the lubricant while avoiding the need of extensively thick material or the sleeve or the bushing.

A sufficient and reliable effect may be achieved when the width of the recess is in a range of 0.1 to 10 mm, which creates a sufficient volume for the lubricant while avoiding a high degree of deformations on the surface opposite to the recess. Preferably, the recess has width in a range of 0.5 to 3 mm. Broader recesses lead to more signficant deformations under pressure and therefore increased wear at the edges of the recesses. Further, this is the range which is easy to make in practice.

In an embodiment which is preferred in terms of a small ratio between width of the recess and volume of the recess, the recess is formed as a groove. Preferably, the recess is formed as one out of a plurality of grooves formed as straight lines or curved lines in parallel or crossed over.

In an alternative embodiment of the invention, the recess may be formed as one out of a plurality of isolated dimples. As compared to grooves, dimples may reduce the risk of lubricant leakage and provide a better hydrodynamic lubrication effect.

It is further proposed that the recess is formed as one out of a plurality of isolated recesses, wherein a density of a recessed surface area is 1 to 40%, preferably 5-20% of the total surface area. This ensures a sufficient support on the portions of the surface other than the recesses while providing a sufficient volume of lubricant. Lower density will have a limited lubrication effect. Higher density will reduce the solid-solid contact surface, increase contact stress and reduce load carrying capacity, e.g. increase wear and reduce lifetime.

It is further proposed that an oil-repelling coating is applied on at least one edge portion of the landing surface provided with the recess. Preferably, the oil-repelling coating has surface energy below 0.028 N/m, preferably below 0.015 N/m. The surface energy of lubricant oil (or base oil of grease) is in the range of 30 to 35 N/m. The surface tension of the oil-repelling coating shall be lower than that of oils.

It is further proposed that the lubricant is removed from portions other than recessed portions of the surface being provided with the at least one recess. This prevents unintended leakage of the lubricant, which is difficult to control outside of the recesses.

In a preferred embodiment, the lubricant is a grease with base oil kinematic viscosity (measuring method ASTM D7279-08, ASTM D445) higher than 60 cts (mm$^2$/s) at 40° C., preferably higher than 90 cst, and consistency NLGI 2 or higher as specified by the standard classification of lubricating grease established by the National Lubricating Grease Institute (NLGI).

The lifetime of the bearing can be further extended when the lubricant contains at least one anti-wear additive and/ or when the lubricant contains at least one extreme pressure (EP) additive.

The applicability of the device for vacuum applications can be established when the lubricant contains is a vacuum greases with PTFE thickener.

The leakage can be safely avoided for most of the applications when the lubricant contains a higher viscosity base oil, preferably with viscosity values above 200 cst at 40° C.

For vacuum applications, it is proposed that a vapor pressure of a base oil of the lubricant is lower than $10^{-9}$ torr at 25° C., preferably lower than $10^{-12}$ torr such as PFPE oil.

As an alternative to the use of grease, the lubricant may be a lubricating oil, in particular a lubricant oil having viscosity higher than 60 cts, preferably higher than 90 cst, and consistency NLGI 2 or higher. In order to enable the use of the bearing in vacuum applications, it is proposed that the lubricant is a vacuum oil with high viscosity, preferably above 200 cst at 40° C.

The leakage can be further reduced and adhesion of the lubricant after the initial run-in-phase may be avoided when the landing surface opposite to the landing surface provided with the at least one recess is provided with an oleophobic coating.

A further aspect of the invention relates to a magnetic bearing including at least one landing bearing of the kind described above. Preferably, the magnetic bearing includes at least one radial landing bearing and at least one radial-axial landing bearing.

The above description of the invention as well as the appended claims, figures and the following description of preferred embodiments show multiple characterizing features of the invention in specific combinations. The skilled person will easily be able to consider further combinations or sub-combinations of these features in order to adapt the invention as defined in the claims to his or her specific needs.

DETAILED DESCRIPTION OF THE EMBODIMENTS

Figure 1:
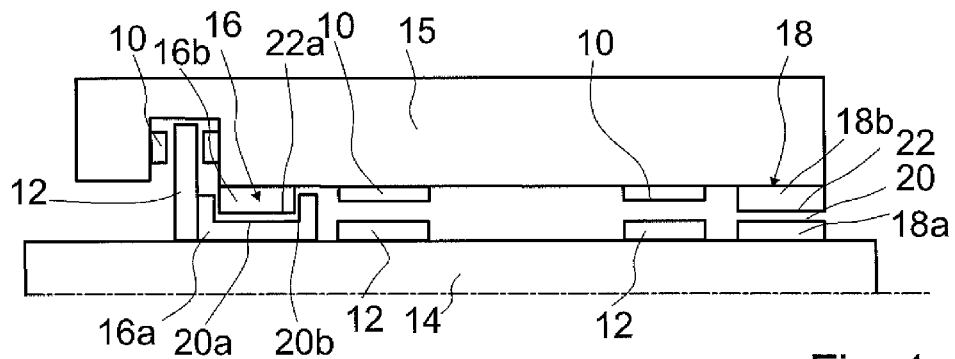
FIG. 1 is a schematic drawing of a magnetic bearing including two landing bearings according to the invention.

FIG. 1 is a magnetic bearing including a stator 10 mounted in a housing 15 and a rotor 12 mounted on a shaft 14, a first landing bearing 16 and a second landing bearing 18.

The first landing bearing 16 as a radial/axial landing bearing and comprises a sleeve 16a mounted on the shaft 14 and a bushing 16b mounted in a housing 15 carrying the stator 10 (not shown). Both the sleeve 16a and the busing 16b comprise a radial landing surface 20a, 22a and two axial landing surfaces 20b, 22b facing the other radial landing surface 20a, 22a, and one of the axial landing surfaces 20b, 22b respectively, wherein a small gap is provided between the surface facing each other when the magnetic bearing is in the state of magnetic levitation.

In the case of failure of the magnetic bearing, e.g. when the current is interrupted or when strong impacts hit the magnetic bearing, the landing surfaces facing each other may come into contact. In the case of an interruption of power supply, the landing bearing 16, 18 will support the shaft 10 rotating at high speeds of e.g. several tenths of thousands of revolutions per minute and the friction between the sleeves 16a, 18a and the bushings 16b, 18b will slow down the rotation and finally stop it.

Depending on the field of application, the landing bearings have to support at least a certain number of such stop processes before being worn out.

Basically the same applies for the second landing bearing 18, which is, however, formed as a radial-only landing bearing with a radial landing surface 20 of the sleeve 18a and the pertinent radial landing surface 22 of the bushing 18b.

The invention relates to a specific structure of the landing surfaces 20, 20a, 20b, 22, 22a, 22b. The following description describes this structure for the landing surface 20, which is taken as an example. However, the structure may be applied to any of the landing surfaces, to multiple landing surfaces or to all of the landing surfaces described above. In a preferred embodiment, the landing surfaces 20, 20a, 20b of the sleeves 16a, 18a are provided with the structure and the respectively opposing landing surfaces may be formed as stainless steel surfaces optionally coated with an oleophobic coating, which may avoid adhesion of the grease in the initial run-in stage.

Figure 2:
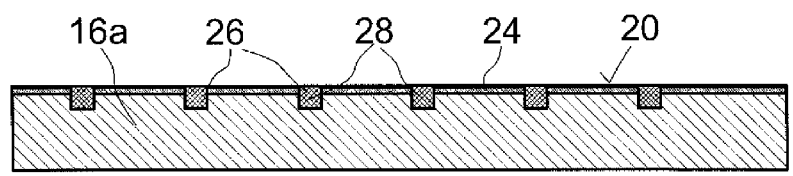
FIG. 2 is a cross-section of a landing surface of a sleeve of one of the landing bearings of FIG. 1 according to a first embodiment of the invention.

FIG. 2 is a cross-section of the landing surface 20 of the sleeve 16a according to a first embodiment of the invention.

The sleeve 16a is made of hardened steel with a surface hardness of 56 HRC or more and the landing surface 20 of the sleeve 16a is coated with a porous structure layer 24 applied by a chemical conversion process at a temperature between 80 and 140° C., which is chosen in this example to be a black oxide coating but which may be an Mn-phosphate or a Zn—Ca-phosphate coating. The resulting pore size is around 0.5 μm and the porosity density is around 7%. The thickness of the porous structure layer is 5 μm. Note that the thickness in FIG. 1 is strongly exaggerated in order to make the porous structure layer 24 visible.

The hardened steel of the bushing 18b, 16b may have a lower surface hardness than the steel of the sleeves 16a, 18a.

As illustrated in FIG. 2, a landing surface 20 of the sleeve 18a is provided with a regular pattern of recesses 26 in the form of grooves with a basically rectangular profile, a groove depth of 0.7 mm and a width of 2 mm.

The recesses 26 and the pores in the porous structure layer 24 are completely filled with a lubricant 28 such as grease or a lubricant oil or with a base oil of the lubricant. The lubricant chosen depends on the field of application but should be a high viscosity lubricant with a viscosity higher than 60 cSt ($mm^2$/second) at 40° C., preferably higher than 90 cSt and consistency NLGI 2 or higher as specified by the standard classification of lubricating grease established by the National Lubricating Grease Institute (NLGI)). The viscosity can be further increased with PTFE thickener and the lubricant chosen may have anti-friction or extreme pressure additives. For vacuum applications, a lubricant with a base oil having a vapor pressure lower than $10^{-9}$ torr at 25° C., preferably lower than $10^{-12}$ torr should be chosen. The viscosity of the vacuum grease or vacuum oil should preferably be above 200 cSt at 40° C.

The following part of the description relates to further embodiments of the invention, wherein features with similar functions are designated using the same reference numbers in order to highlight the similarity. The description is limited to differences to the embodiment of FIGS. 1 and 2 and abstains from repeating features which are unchanged. For the latter features, the reader should refer to the above description of FIGS. 1 and 2.

Figure 3:
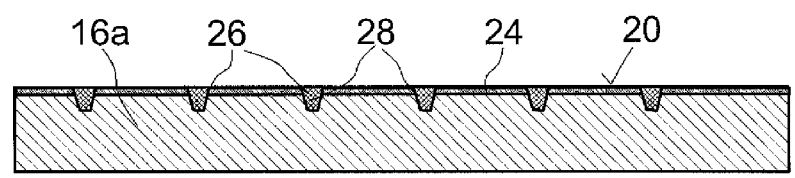
FIG. 3 is a cross-section of a landing surface of a landing bearing according to a second embodiment of the invention.

FIG. 3 is a cross-section of a radial landing surface 20 of the sleeve 18a according to a second embodiment of the invention, wherein the profile of the grooves forming the recesses 26 is trapezoidal.

Figure 4:
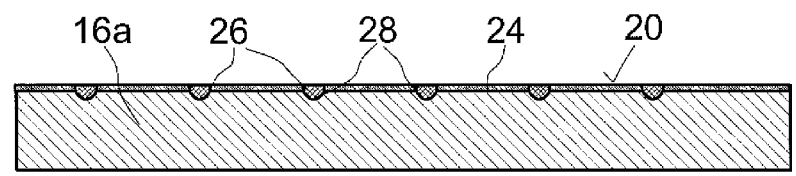
FIG. 4 is a cross-section of a landing surface of a landing bearing according to a third embodiment of the invention.

FIG. 4 is a cross-section of a landing surface 20 of the sleeve 18a wherein the grooves forming the recesses 26 have a semi-circular cross-section.

Figure 5:
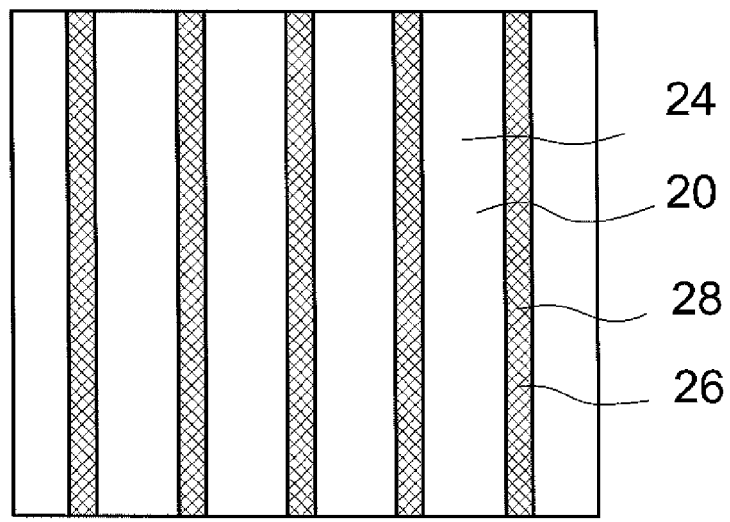
FIG. 5 is a top view of a landing surface of a landing bearing according to a fourth embodiment of the invention further applicable to the embodiments of FIGS. 1-4.

FIG. 5 is a top view of the landing surface 20 of the sleeve 18b illustrated as flat, unrolled surface wherein it is illustrated that the grooves forming the recesses 26 are arranged parallel in the circumferential direction of the sleeve 18a.

Figure 6:
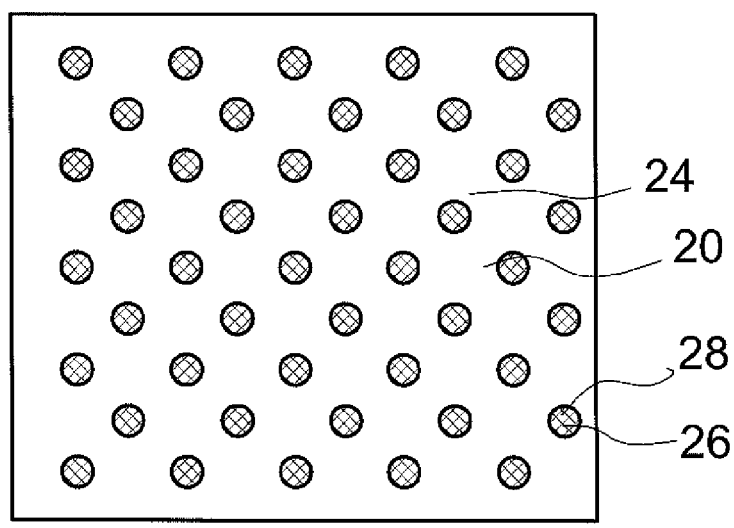
FIG. 6 is a top view of a landing surface of a landing bearing according to a fifth embodiment of the invention further applicable to the embodiments of FIGS. 1-4.

FIG. 6 is a top view of a fifth embodiment of the invention, wherein the recesses 26 are formed as isolated dimples arranged in a regular lattice pattern.

Figure 7:
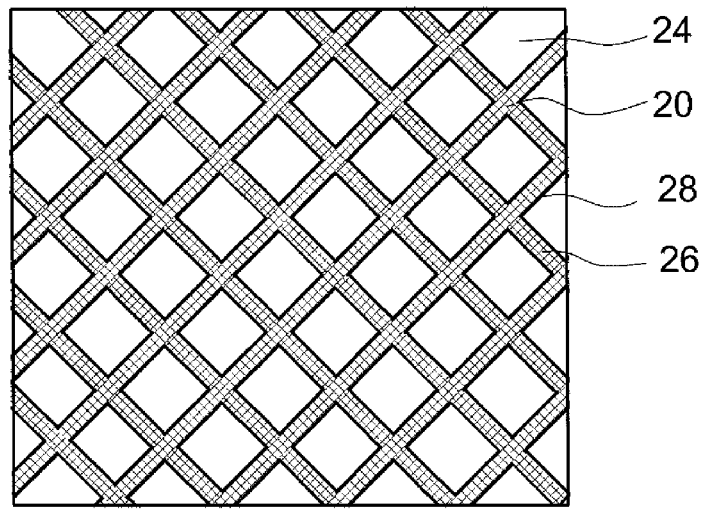
FIG. 7 is a top view of a landing surface of a landing bearing according to a sixth embodiment of the invention further applicable to the embodiments of FIGS. 1-4.

FIG. 7 is a top view of a sixth embodiment of the invention, wherein the recesses 26 are formed as a plurality of grooves, wherein a first set of mutually parallel grooves crosses a second set of mutually parallel grooves at right angles such that a rectangular lattice pattern is formed. It goes without saying that the angle between the grooves crossing each other could be chosen different from 90°.

The top views of FIGS. 5-7 may be combined with each of the embodiments of FIGS. 2 to 4.

Figure 8:
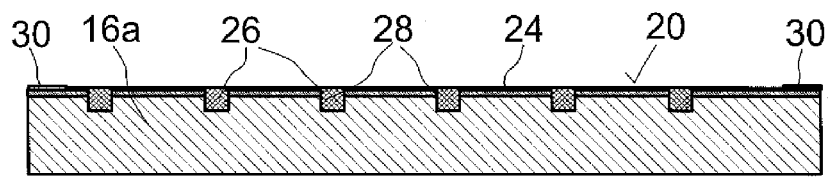
FIG. 8 is a cross-section of a landing surface of a landing bearing according to a seventh embodiment of the invention.

FIG. 8 is a cross-sectional view of a landing surface 20 of the sleeve 18a according to a seventh embodiment of the invention, wherein the recesses 26 are formed as grooves with a rectangular profile corresponding to the profile of FIG. 2 and wherein, in addition to the features of FIG. 2, two strips of an oil repelling coating 30 are provided along the axially outer edges of the sleeve 18a.

In the embodiment of FIG. 8, the oil repelling coating 30 is applied on top of the porous structure layer 24. In alternative embodiments of the invention, the oil repelling coating could be applied directly on the stainless steel surface of the sleeve 18a.

The oil repelling coating 30 has a surface energy for the base oil of the lubricant 28 below 0.015 N/m.

Figure 9:
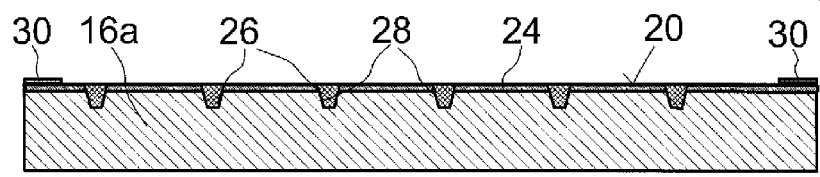
FIG. 9 is a cross-section of a landing surface of a landing bearing according to an eighth embodiment of the invention.
Figure 10:
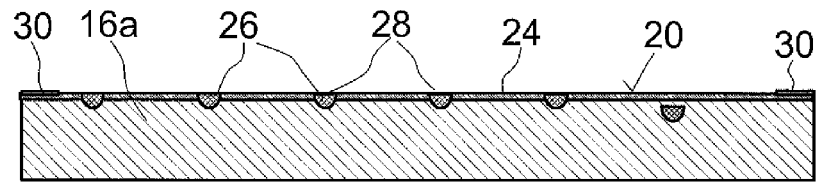
FIG. 10 is a cross-section of a landing surface of a landing bearing according to a ninth embodiment of the invention.

FIGS. 9 and 10 are cross-sections according to an eighth and ninth embodiment of the invention basically corresponding to the embodiments of FIGS. 3 and 4, wherein only the oil repelling coating 30 on the lateral edges of the sleeve 18a is added.

Figure 11:
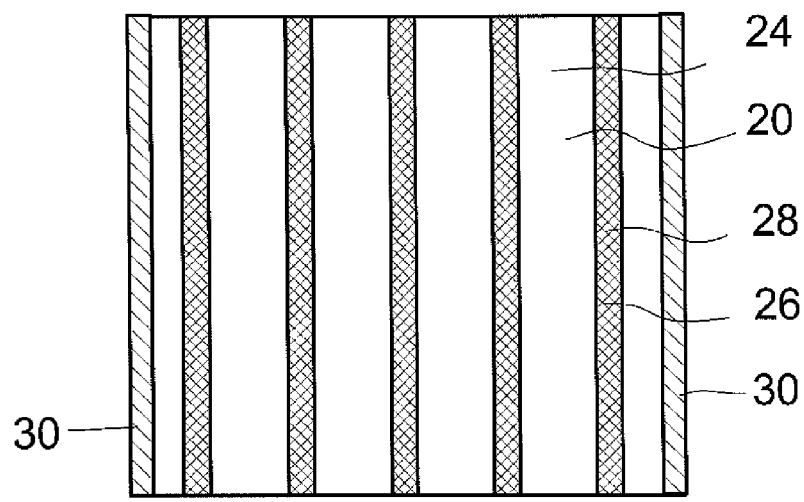
FIG. 11 is a top view of a landing surface of a landing bearing according to a tenth embodiment of the invention further applicable to the embodiments of FIGS. 8-10.
Figure 12:
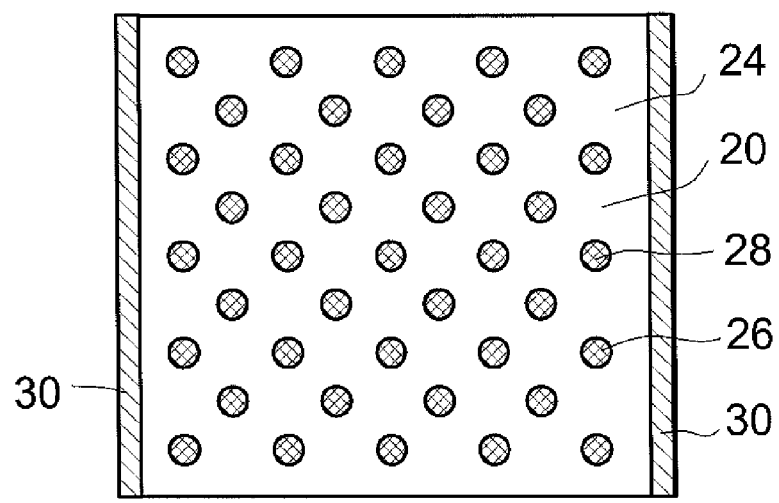
FIG. 12 is a top view of a landing surface of a landing bearing according to an eleventh embodiment of the invention further applicable to the embodiments of FIGS. 8-10.
Figure 13:
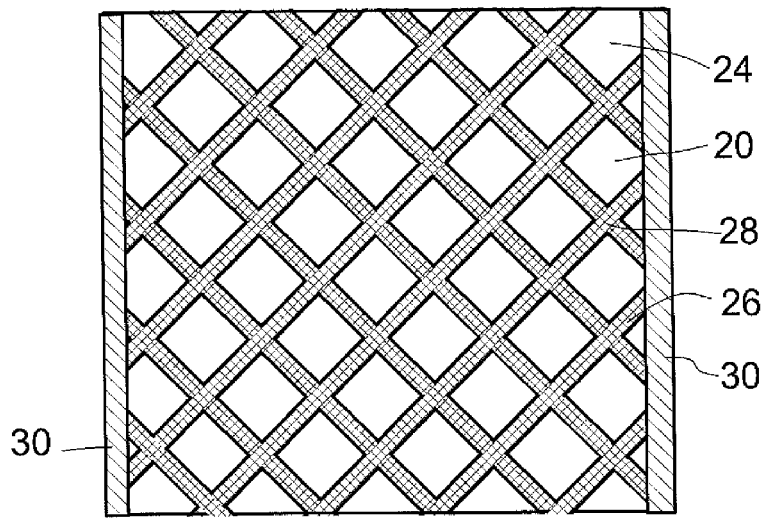
FIG. 13 is a top view of a landing surface of a landing bearing according to a twelfth embodiment of the invention further applicable to the embodiments of FIGS. 8-10.

FIGS. 11 to 13 correspond to the embodiments of FIGS. 5 to 7, wherein only the oil repelling coating 30 on the lateral edges of the sleeve 18a is added.

In each of the embodiments described above, when the bushing 18b presses on the sleeve 18a in the process of a landing, the lubricant 28 is pressed out of the pores of the porous structure layer 24 and lubricates the bearing. In the initial mounting, excess lubricant is removed from the top surface of the porous structure layer. Additional lubricant can be taken from the recesses 26 or may flow into the recesses in the course of the landing operation of the landing bearing 18. Lubricant 28 or base oil flowing axially outside of the landing bearing 18 by the strips of oil repelling coating 30 in the embodiments of FIGS. 8 to 13 such that leakage of lubricant 28 is reliably prevented while at the same time ensuring good lubrication properties. The oleophobic coating on the landing surfaces 22, 22a and 22b of the bushing 16b, 18b prevent the adhesion of lubricant 28 after the stopping process or after the initial run-in stage.

The top views of FIGS. 11 to 13 may be combined with each of the embodiments of FIGS. 8 to 10.

Figure 14:
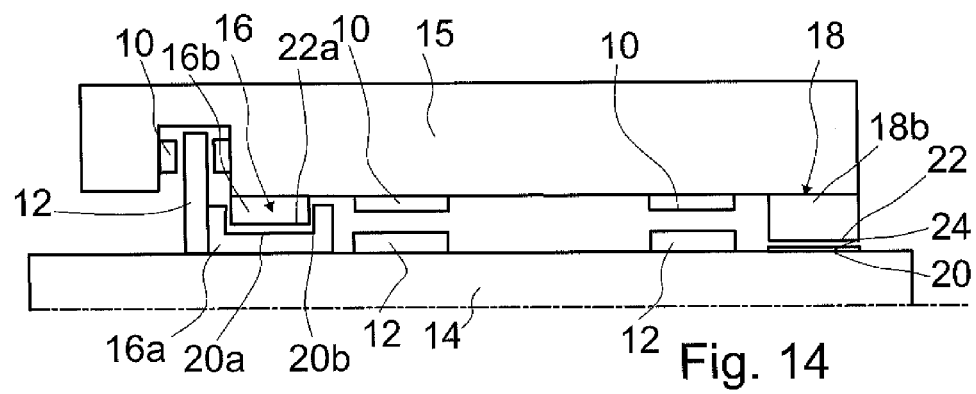
FIG. 14 illustrates a further embodiment of the invention, wherein the landing surface is a coated surface of a rotor shaft.

FIG. 14 illustrates a further embodiment of the invention, wherein the landing surface 20 is a coated surface of a rotor shaft 14. The landing bearing 18 does not comprise a separate sleeve. The inner ring of the landing bearing 18 is rather formed as one piece with the rotor shaft 14, which is directly coated with a porous structure layer 24. The detailed structure of the landing surface 20 may be any of the structures illustrated in FIGS. 2-13.

Figure 15:
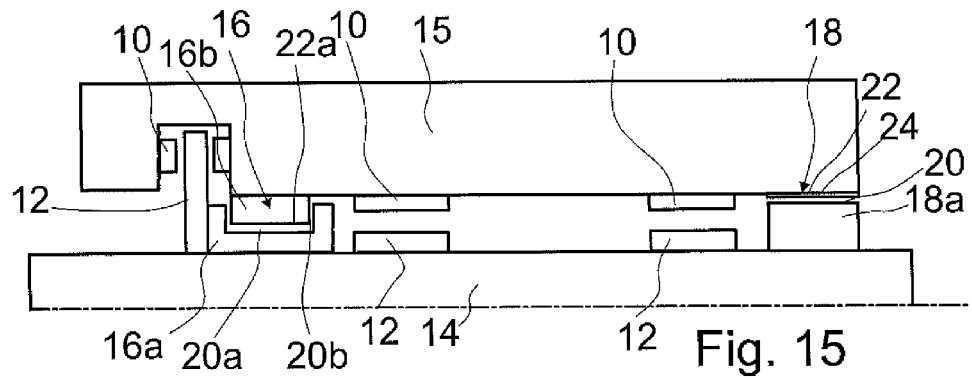
FIG. 15. illustrates a yet further embodiment of the invention, wherein the landing surface is a coated surface of a housing.

FIG. 15 illustrates a yet further embodiment of the invention, wherein the landing surface is a coated radially inner surface of a housing 15. The landing bearing 18 does not comprise a separate bushing. The outer ring of the landing bearing 18 is rather formed as one piece with the housing 15, which is directly coated with a porous structure layer 24. The detailed structure of the landing surface 22 of the housing 15 may be any of the structures illustrated in FIGS. 2-13.

The invention claimed is:

1. A landing bearing for use in a magnetic bearing assembly, the landing bearing comprising:
   a. a first landing surface;
   b. a second landing surface, the second landing surface facing the first landing surface;
   c. the first landing surface is provided with a plurality of recesses for receiving lubricant, wherein each of the plurality of recesses are isolated from the others such that none of the plurality of recesses connect to another one of the plurality of recesses;
   d. a porous structure layer disposed over the first landing surface, wherein a side of the porous structure layer opposite the first landing surface forms a contact surface for initially contacting the second landing surface during use; and
   e. lubricant disposed within the porous structure layer and within the plurality of recesses such that lubricant in the plurality of recesses is capable of travelling from the plurality of recesses and then travelling through the porous structure layer in a circumferential direction prior to reaching the contact surface.

2. The landing bearing according to claim 1, further comprising a landing sleeve configured to be mounted on a shaft, wherein
   the first landing surface is a surface of the landing sleeve.

3. The landing bearing according to claim 2, further comprising a bushing mounted in a housing or in a stator coaxially with the landing sleeve, wherein
   the second landing surface is a surface of the bushing.

4. The landing bearing according to claim 3, wherein the second landing surface is also coated with the porous structure layer.

5. The landing bearing according to claim 1, wherein the porous structure layer has a pore size of 0.001 to 2 µm, porosity density 1 to 20% and/or layer thickness of 0.5 to 20µm.

6. The landing bearing according to claim 5, wherein the porous structure layer provides at least one of Mn-phosphate, Zn-Ca-phosphate and black oxide.

7. The landing bearing according to claim 6, wherein each of the plurality of recesses has a depth in a range of 0.25 to 1 mm.

8. The landing bearing according to claim 7, wherein each of the plurality of recesses has width in a range of 0.5 to 3 mm.

9. The landing bearing according to claim 7, wherein each of the plurality of recesses is formed as one groove out of a plurality of grooves formed as straight lines in parallel or curved lines.

10. The landing bearing according to claim 7, wherein a plurality of isolated dimples forms the plurality of recesses.

11. The landing bearing according to claim 10, wherein a percentage of a recessed surface area is 5-20% of the total surface area of the first landing surface.

12. The landing bearing according to claim 1, wherein a density of a recessed surface area is 5-20% of the total surface area.

13. The landing bearing according to claim 1, further comprising a landing sleeve configured to be mounted on a shaft, wherein
    the second landing surface is a surface of the landing sleeve.

14. The landing bearing according to claim 13, further comprising a bushing mounted in a housing or in a stator coaxially with the landing sleeve, wherein
    the first landing surface is a surface of the bushing.

15. A magnetic bearing assembly including at least one landing bearing, the at least one landing bearing comprising:
    a. a first landing surface;
    b. a second landing surface, the second landing surface facing the first landing surface;
    c. the first landing surface is provided with a plurality of recesses for receiving lubricant, wherein each of the plurality of recesses are isolated from the others such that none of the plurality of recesses connect to another one of the plurality of recesses;
    d. a porous structure layer disposed over the first landing surface, wherein a side of the porous structure layer opposite the first landing surface forms a contact surface for initially contacting the second landing surface during use; and
    e. lubricant disposed within the porous structure layer and within the plurality of recesses such that lubricant in the plurality of recesses is capable of travelling from the plurality of recesses and then travelling through the porous structure layer in a circumferential direction prior to reaching the contact surface.

* * * * *